Oct. 2, 1934. H. C. WOODBRIDGE Re. 19,336

MECHANICAL STOKER

Original Filed April 6, 1932 2 Sheets-Sheet 1

INVENTOR
Howard C. Woodbridge
BY Edward H. Quimby
his ATTORNEY

Oct. 2, 1934. H. C. WOODBRIDGE Re. 19,336

MECHANICAL STOKER

Original Filed April 6, 1932 2 Sheets-Sheet 2

INVENTOR
Howard C. Woodbridge
BY Edward H. Cumpston
his ATTORNEY

Reissued Oct. 2, 1934

Re. 19,336

UNITED STATES PATENT OFFICE 19,336

MECHANICAL STOKER

Howard C. Woodbridge, Rochester, N. Y., assignor to The Standard Stoker Company, Incorporated, a corporation of Delaware Original No. 1,957,304, dated May 1, 1934, Serial No. 603,599, filed April 6, 1932. Application for reissue August 13, 1934, Serial No. 739,639

11 Claims. (Cl. 110—101)

This invention relates to mechanical stokers, and particularly to those of the scatter feed type in which the fuel is distributed over the fuel bed by means of fluid pressure blasts. One object of the invention is the provision of a greatly improved and more satisfactory stoker of this class.

Another object is the provision of a stoker of this kind in which the fine and coarse fuels are separated, and are propelled over the fuel bed by pressure blasts of suitable intensity so as to insure uniform distribution and to reduce stack losses.

Still another object is the provision in such a stoker of a new and improved fuel distributor plate for separating the fine from the coarse fuel, and for positively directing the fine and coarse fuel so as to assure uniform distribution thereof over the fire.

A further object is the provision of a nozzle block with improved features for delivering substantially all the fuel to the distributor plate before it comes into the range of the pressure blasts.

An additional object is the provision of such a stoker which is simple in construction, inexpensive to manufacture, and effective in use.

To these and other ends the invention resides in certain improvements and combinations of parts, all as will be hereinafter more fully described, the novel features being pointed out in the claims at the end of the specification.

In the drawings:

Fig. 4 is a vertical sectional view taken through the nozzle block substantially on the line 4—4 of Fig. 2, showing the position and arrangement of the upper and lower jets and the pressure tunnels therefor;

Fig. 5 is a vertical sectional view taken through the nozzle block intermediate the vertical planes of the jets showing the recesses for directing the fuel to the distributor plate.

The same reference numerals throughout the several views indicate the same parts.

Figure 1:
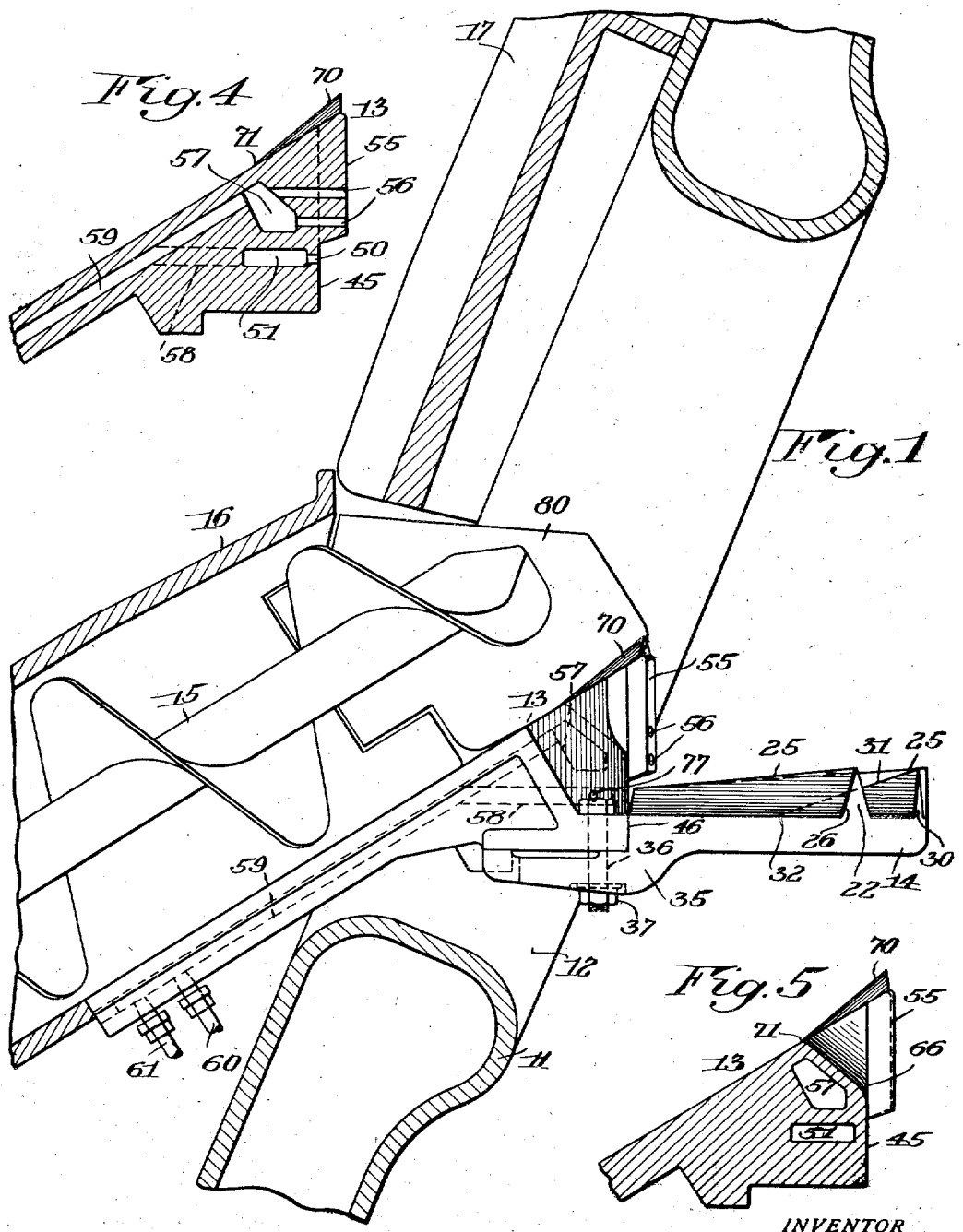
Fig. 1 is a vertical sectional view of a portion of a locomotive fire box showing the invention as applied thereto.

In many of the stokers of the scatter feed type, the fuel such, for example, as coal is fed into the zone of the fluid pressure blasts, the fine and coarse coal being subjected to blasts of equal intensity. If such blasts are sufficiently powerful to evenly distribute the coarse coal over the fuel bed, the fine coal will be driven toward the front end of the fire, with the result that the fire will be light at the rear end and heavy at the front end. Furthermore, much of the fine coal will be carried out the stack without being consumed. If, on the other hand, the blasts are of sufficient intensity to evenly distribute the fine coal, substantially all the coarse coal will be deposited at the rear of the fire. In either event, the fire will be uneven, and low combustion efficiencies will result. To secure a more even distribution of both the fine and the coarse coal, some forms of scatter feed stokers provide means for separating the fine from the coarse coal and then subjecting them to fluid pressure blasts of different intensities. This latter type, while more effective than the former, fails to provide means for positively directing the fuel so as to provide the uniform distribution which is essential to maximum combustion efficiencies.

The present invention overcomes these objectionable features by providing a stoker of the scatter feed type having a fuel distributor plate along which substantially all the coal is propelled by fluid pressure blasts of suitable intensity. The plate is provided with spaced diverging ridges which effectively separate the fine from the coarse coal, the fine coal being propelled along the plate between the ridges by low pressure blasts, and the coarse coal being propelled along the ridges by high pressure blasts. In addition to separating the fuel, the ridges also provide means for positively directing both the fine and the coarse fuel so as to secure uniform distribution over the entire fuel bed, the pressure blasts providing the motive power for sliding the coal along the plate and the ridges.

Referring now to the drawings, the numeral 11 designates the back wall of a locomotive fire box having a firing opening 12 therein. A stoker of the scatter feed type is arranged to extend through the opening 12 into the fire box, and to receive and spread the coal over the fire. The stoker comprises, in general, a nozzle box, turret or block 13, and a fuel distributor plate 14 arranged below and forwardly of the block, both of which members will be hereinafter more fully described. The coal is delivered to the stoker from a source of supply, such as a locomotive tender, by means of any suitable conveying mechanism, such for example, as a screw conveyor 15 of any well known construction enclosed in a housing 16. The opening 12 above the conveyor is closed by the usual fire door 17 through which access to the fire box may be had.

Figure 2:
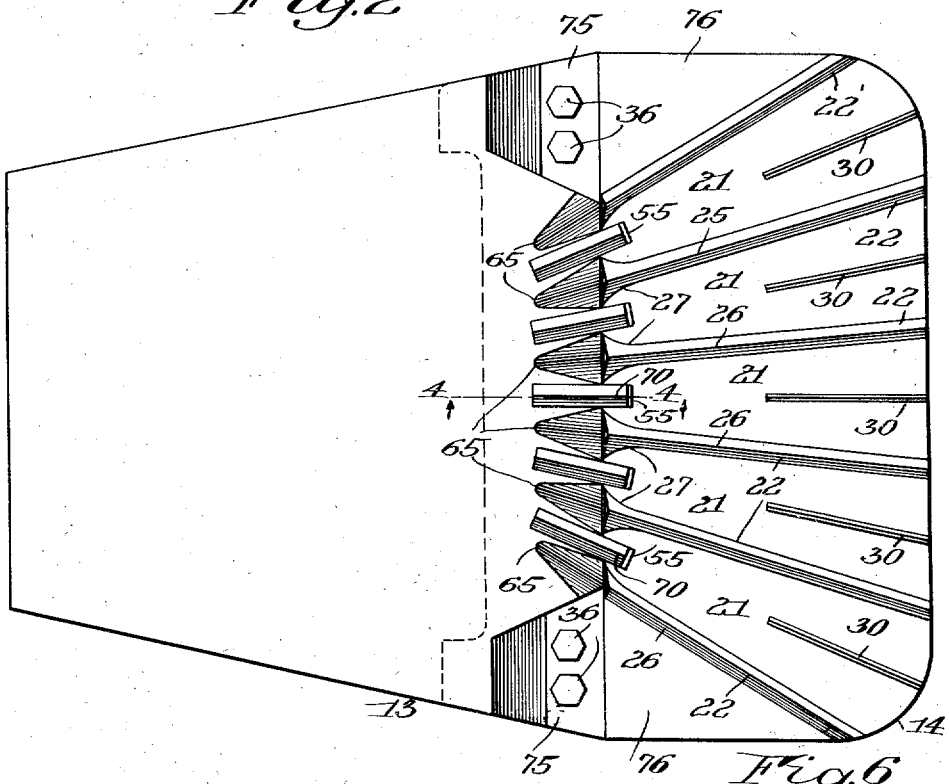
Fig. 2 is a plan view of the stoker constructed in accordance with the preferred embodiment of the invention.
Figure 3:
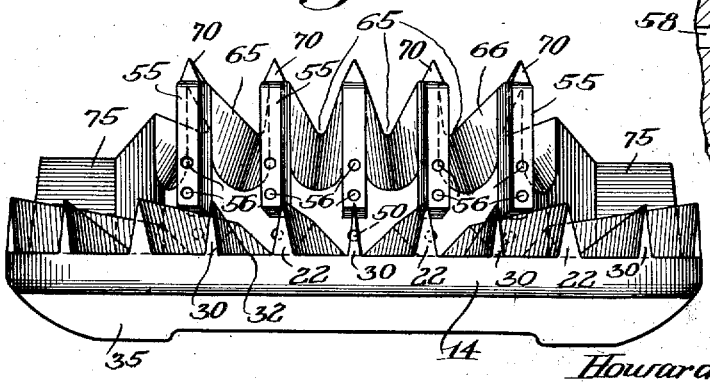
Fig. 3 is a front view of the stoker illustrated in Fig. 2.

The coal is delivered from the conveyor 15, in a manner hereafter described, to the distributor plate 14, the upper surface of which is divided into a plurality of diverging channels 21 by spaced ridges 22 formed integral with the plate and extending substantially the full length thereof, as clearly illustrated in Figs. 1 and 2. These ridges are arranged in the manner best shown in Fig. 2, and are preferably of a triangular or an inverted V-shape having sharp upper edges 25 and tapered side walls 26, as shown in Figs. 1 and 3. When the coal is fed onto the edges 25, it is deflected to both sides of the ridges and directly into the range of the fluid pressure blasts, as hereafter pointed out, the fine coal falling into the channels 21 between the ridges, and the coarse coal being supported on the upper edges 25 or the inclined sides 26 of the ridges. The rear ends 27 of the ridges 22 are preferably flared out, as shown in Fig. 2, the purpose of which construction will be hereinafter pointed out.

The upper edges 25 of the ridges 22 are preferably inclined upwardly toward the discharge end of the plate, that is, in the direction of the movement of the fuel, so that the ridges are higher at the front or discharge end of the plate than at the rear or feeding end where the propelling force is applied to move the fuel, as clearly shown in Fig. 1. The object of such a construction is to project or slightly direct upwardly the lumps of coal which are large enough to slide along the edges 25 or the sloping sides 26 of the ridges, thus materially assisting in the even distribution of the coarse coal over the fuel bed.

The present invention also provides auxiliary fuel separating means in the form of short, thin, inverted V-shaped ridges 30 positioned in the forward portions of the channels 21 intermediate the ridges 22, as clearly illustrated in Fig. 2. The upper edges 31 of these ridges preferably have a greater inclination than the edges 25 of the ridges 22, and extend upwardly from the surface of the plate, as shown at 32, Figs. 1 and 3, and preferably terminate substantially in the horizontal plane of the discharge ends of the ridges 22. By means of this construction, any lumps of coal which fall into the channels 21 between the sides 26 will be directed upwardly by the intermediate ridges 30 and made to travel further forward in the fire box, thus assuring an even distribution of the coarse coal, the fine coal being moved substantially horizontally along the surface of the plate 14. While the present embodiment shows that each channel is provided with only one such intermediate ridge positioned substantially on the center line thereof, it is contemplated that two or more of such ridges may be employed if desired. If two or more intermediate ridges are used in each channel, they are preferably evenly spaced between the adjacent ridges 22.

The plate 14 is provided with a rearwardly extending engaging member 35, of the shape best shown in Fig. 1, which is arranged to be secured to the bottom of the nozzle block 13 to detachably secure the plate 14 thereto. The member 35 and the adjacent portion of the block are provided with registering apertures through which bolts 36 extend. The lower ends of the bolts are threaded to receive nuts 37 which securely clamp the member 35 in engagement with the bottom of the nozzle block, as clearly illustrated in Fig. 1. When the plate 14 is to be detached, the nuts 37 are removed and the plate 14 may be disengaged from the nozzle block without necessitating the removal of the latter.

The block 13 is disposed to the rear of the plate 14 and forms a continuation of the bottom wall of the conveyor housing 16, as clearly illustrated in Fig. 1. The block is detachably secured to the housing 16 in any suitable or well known manner, and is arranged to extend through the fire opening 12 and to the fire box. The block is formed with a substantially vertical front face 45, the lower end of which is arranged to engage the rear edge 46 of the plate 14, in the manner best shown in Fig. 1.

The face 45 of the block is provided, adjacent the lower end thereof, with a plurality of jets 50 leading from a pressure tunnel 51 extending transversely of the block 13. These jets are positioned slightly above the surface of the plate 14 and substantially on the center lines of the channels 21, and provide openings through which fluid pressure means, such for example, as steam, may issue to propel the fine coal along the bottoms of the channels. The upper portion of the face 45 may be provided with a plurality of forwardly extending lugs 55, each of which is provided with one or more, in the present instance two, jets 56 leading from the pressure tunnel 57. The jets 56 are in the vertical planes of the lower jets 50, but are positioned above and forwardly thereof, as clearly shown in Fig. 4, and provide openings through which steam may issue to propel the coarse coal along the ridges 22 and 30. The tunnels 51 and 57 are connected by cored passageways 58 and 59, respectively, to pipes 60 and 61 positioned exteriorly of the fire box. These pipes are in turn connected to a suitable source of fluid pressure, such for example, as the locomotive boiler. Suitable valves, not shown, may be provided in the lines 60 and 61 to control the pressure of the steam to the jets 50 and 56.

In order to assure the even distribution of both the fine and coarse coal and to reduce stack losses, it has been found desirable to have substantially all the coal fed to the distributor plate 14 before coming into the range of the blast issuing from the jets 50 and 56. To this end, the block 13 is provided with recesses 65, of the shape best shown in Figs. 2, 3, and 5, positioned intermediate the vertical planes of the jets, as clearly shown in Fig. 3. These recesses are provided with inclined bottoms 66 arranged to direct to the plate 14 substantially all fuel delivered by the conveyor 15. By means of this arrangement substantially all the coal is delivered to the fuel distributing plate 14 before coming into the range of the fluid pressure blasts issuing from the jets.

To prevent any fuel from being fed over the upper ends of the lugs 55 and into the range of the upper jets 56, the present invention further provides means for directing substantially all the fuel into the recess 65. This means comprises, in the present embodiment, upwardly inclined inverted V-shaped ridges 70 arranged on the upper surface of the block 13 and the lugs 55 intermediate the recess 65, as clearly illustrated in Figs. 3, 4, and 5. These ridges extend upwardly from the surface of the block adjacent the rear end of the recess, as shown at 71, Figs. 4 and 5, and provide means for directing into the recess 65 any fuel which moves along the upper surface of the block 13 and lugs 55 intermediate the recess, thus assuring that substantially all the fuel will be directed to the plate 14 before coming into the range of the fuel pressure blasts.

Referring now to Fig. 2, it is seen that the ridges 22 are positioned in alinement with the recess 65 so that as the coal is discharged from the recess it falls downwardly onto the ridges 22, the upper edges 25 and the inclined sides 26 of which then direct the coal laterally into the channels 21 and into the range of the upper and lower jets, the fine coal falling to the bottom of the channels and being propelled by the lower jets and the coarse coal being supported by the ridges and being propelled along the ridges by both the upper and lower jets.

When a comparatively few ridges 22 are employed, as in the present instance, the width of the rear ends of the channel 21 is greater than the width of the jets 50, so that dead coal areas may be formed between these jets and the adjacent sides 26 of the ridges. To prevent the formation of such areas and to reduce the loss of burnt distributor plates resulting therefrom, the rear ends 27 of the ridges 22 are preferably flared out, as shown in Fig. 2 and heretofore pointed out, so that the rear ends of the channels 21 have a width substantially equal to the diameter of the jets 50, as clearly illustrated in Fig. 3. With this construction, substantially all the coal which falls into the channels 21 comes into the range of the fluid pressure blasts issuing from the lower jets, and the possibility of such dead coal areas and resulting burnt distributor plates is very materially reduced. When a large number of ridges are used, the width of the flared portion may be reduced or even eliminated, if desired.

Figure 6:
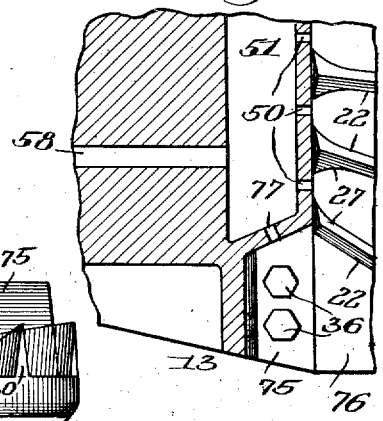
Fig. 6 is a fragmentary view of one side of the stoker illustrated in Fig. 2, on a larger scale, with parts in section and parts in elevation, showing the arrangement of the lower tunnel and jets.

To provide means for supplying the outer rear corners of the fire box with fine and coarse coal, the front portion of the block 13 is cut away at the sides thereof to form pockets 75 which, with the adjacent side portion 76 of the plate 14, are arranged to receive a supply of fine and coarse coal from the outer recess 65 and the outer ridges 22, as will be understood from an inspection of Fig. 2. The fine and coarse coal is propelled to the outer corners by means of fluid pressure blasts issuing from the jet openings 77 arranged in the manner shown in Fig. 6 and leading from the tunnel 51. The amount of coal fed to the corners is controlled by suitable means, such as vanes 80, one of which is shown in Fig. 1, pivotally mounted on the conveyor housing in any suitable or well known manner.

As stated above, the lower jets move the fine coal along the bottom of the channels 21 and the upper jets slide the coarse coal along the ridges 22 and 30 to afford an even distribution of the fine and coarse coal over the entire fuel bed. In addition to providing the motive power for moving the coarse coal, the steam issuing from the upper jets 56 also affords, in effect, a steam blanket which prevents the fine coal from being deflected upwardly. The pressure of the blasts issuing from the upper jets 56 is preferably higher than the pressure of the blasts issuing from the lower jets 50, although equal pressure may be used on both the upper and lower jets if desired.

While the operation of the stoker has been fully disclosed in connection with the description of the various parts, it may be desirable to give a brief summary at this point. The coal is delivered by the conveyor 15 from a source of supply, such as a locomotive tender. As the coal is fed over the block 13, it is directed by the recess 65 and ridges 70 so as to fall onto the upper edges 25 of the ridges 22 rearwardly of the upper jets 56 and forwardly of the lower jets 50. The ridges 22 then deflect the coal laterally into the channels 21 and into the range of the jets 50 and 56, the fine coal falling to the bottom of the channels and the coarse coal being supported by the ridges. By means of this arrangement, substantially all the coal is delivered to the plate 14 before any of it is subjected to the fluid pressure blasts. The upper blast provides means for directing the coarse coal, and also forms a blanket to prevent the fine coal from being deflected upwardly. The ridges 22 and 30 not only provide means for separating the fine and coarse coal, but also provide means for positively directing the coarse coal upwardly to secure uniform distribution thereof over the entire fuel bed.

It is apparent from the above description that the present invention provides a stoker, of the class above described, which effectively separates the fine and the coarse coal, each of which is positively propelled and directed so as to afford uniform distribution of the fine and coarse fuel over the entire fuel bed. The jets 50 and 56 provide the means for moving the fine and coarse coal along the plate in the manner above described. This stoker arrangement thus enables high combustion efficiency to be secured by reason of the even distribution of the fine and coarse coal, and is also readily adaptable to a wide range of fuel.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. In a fuel distributing system, the combination with a nozzle block, of a fuel distributor plate, spaced forwardly diverging ridges extending substantially from said nozzle block forwardly through substantially the full length of said plate and providing the latter with a plurality of channels, short intermediate ridges positioned in the forward portions of said channels, said ridges providing means for separating the fine from the coarse fuel, and fluid pressure jets in said block for propelling the fine and the coarse fuel in said channels and along said ridges respectively.

2. In a fuel distributing system, the combination with a nozzle block, of a fuel distributor plate, spaced forwardly diverging ridges extending substantially from said nozzle block forwardly through substantially the full length of said plate and dividing the latter into a plurality of channels, short intermediate ridges positioned in the forward portions of said channels, said ridges providing means for separating the fine from the coarse fuel, the fine fuel moving in the channels and the coarse fuel moving along the ridges, said ridges being inclined upwardly towards the discharge end of said plate, and fluid pressure means associated with said block for moving the fine and coarse fuel.

3. In a fuel distributing system, the combination with a nozzle block, of a fuel distributor plate, means for feeding fuel to said distributor plate, means for initially separating the fine from the coarse fuel, said means comprising spaced forwardly diverging ridges extending substantially the full length of said plate and dividing the latter into a plurality of channels, auxiliary separating means in the form of short intermediate ridges positioned in the forward portions of said channels and cooperating with said first mentioned ridges to further separate the fuel, said ridges being inclined upwardly towards the discharge end of said plate to direct the coarse fuel upwardly, said intermediate ridges extending upwardly from the surface of said plate and terminating substantially in the horizontal plane of the discharge ends of said first mentioned ridges, and fluid pressure means in said block directed forwardly over said plate for propelling the fine and the coarse fuel.

4. In a fuel distributing system, the combination with a nozzle block, of a fuel distributor plate extending forwardly of said block, means for feeding fuel to said distributor plate, relatively wide inverted V-shaped ridges with intermediate channels extending substantially the full length of said plate for separating the fine from the coarse fuel, the fine fuel moving in said channels and the coarse fuel moving along said ridges, said ridges being inclined upwardly toward the discharge end of said plate, relatively narrow inverted V-shaped ridges positioned in the forward portions of said channels intermediate said first mentioned ridges, said intermediate ridges extending upwardly from the surface of the plate and terminating substantially in the horizontal plane of the discharge ends of said first mentioned ridges, and low and high pressure jets in said block directed forwardly over the fuel supporting surfaces of said plate for propelling said fine and said coarse fuel.

5. Fuel distributing means comprising, in combination, a nozzle block formed with laterally spaced upper jets and laterally spaced lower jets positioned rearwardly of said upper jets and in substantially the same forwardly extending vertical planes as said upper jets, a fuel distributor plate below and extending forwardly of said block for receiving and spreading fuel to be propelled by the jets, said block having recesses intermediate the vertical planes of said jets for directing to said plate rearwardly of the upper jets and forwardly of the lower jets fuel which is fed to the distributing means, and fluid pressure means connected to said jets for propelling the fuel along said plate.

6. Fuel distributing means comprising, in combination, a nozzle block, a fuel distributor plate below and extending forwardly of said block, said block having a plurality of forwardly diverging jets on the front face thereof slightly above the plane of said plate, nozzle members positioned above and substantially in the vertical planes of said jets and projecting forwardly from said face, said block being formed with recesses extending rearwardly from the upper front edge thereof intermediate the planes of said nozzles to provide means for directing to said plate rearwardly of and intermediate said nozzles the fuel fed to said distributing means, inverted V-shaped ridges arranged on the upper surface of said block and said nozzles intermediate said recesses to direct the fuel into said recesses, and high and low pressure fluid blasts connected to said nozzles and jets respectively for propelling the fuel along said plate.

7. Fuel distributing means comprising, in combination, a nozzle block formed with upper and lower forwardly directed jets, a fuel distributor plate below and extending forwardly of said block, said block having means for deflecting to said plate intermediate the vertical planes of said jets fuel fed to said distributing means, diverging ridges arranged on said plate intermediate the vertical planes of said jets, and extending substantially the full length of said plate to provide channels on the surface thereof, said ridges providing means for separating the fine from the coarse fuel, and being inclined upwardly towards the discharge end of said plate to facilitate the upward movement of the coarse fuel, and low and high pressure fluid means secured to the lower and upper jets respectively to propel the fine and the coarse fuel.

8. Fuel distributing means comprising, in combination, a nozzle block formed with upper and lower jets, a fuel distributor plate below and adjacent said block and extending forwardly thereof, means comprising recesses formed in said block intermediate the vertical planes of said jets for directing to said plate rearwardly of said upper jets fuel fed to said distributing means, diverging ridges extending substantially the full length of said plate to provide channels substantially in the vertical planes of said jets, said ridges providing means for separating the fine from the coarse fuel, the fine fuel moving in said channels and the coarse fuel moving on said ridges, said ridges being of upwardly decreasing transverse thickness and of longitudinally increasing height in the direction of the movement of the fuel along said plate, and high and low fluid pressure means connected to said jets for propelling said coarse and said fine fuel.

9. Fuel distributing means comprising, in combination, a nozzle block formed with upper high pressure jets, and lower low pressure jets in the vertical planes of the upper jets and rearwardly thereof, a fuel distributor plate below and extending forwardly of said block, said block having means for directing to said plate intermediate the vertical planes of said jets fuel fed to said distributing means, diverging ridges extending substantially the full length of said plate to form channels substantially in the vertical planes of said jets, said ridges providing means for separating the fine from the coarse fuel, short intermediate ridges positioned in the forward portions of said channels intermediate said first mentioned ridges and cooperating with the latter to further separate the fine and the coarse fuel, and high and low fluid pressure means connected to the upper and lower jets to propel the coarse and the fine fuel.

10. Fuel distributing means comprising, in combination, a nozzle block formed with laterally spaced groups of jets, each group comprising upper and lower jets positioned in substantially the same forwardly extending vertical plane, a fuel distributor plate below and extending forwardly of said block for receiving fuel to be propelled by the jets, said block having recesses intermediate the vertical planes of said jets for directing to said plate between said groups of jets fuel which is fed to the distributor means, and means for supplying pressure fluid to said jets for propelling the fuel along said plate.

11. Fuel distributing means comprising, in combination, a nozzle block formed with laterally spaced groups of jets, each group comprising upper and lower jets positioned in substantially the same forwardly extending vertical plane, a fuel distributor plate below and extending forwardly of said block for receiving fuel to be propelled by the jets, said block having recesses intermediate the vertical planes of said jets for directing to said plate between said groups of jets fuel which is fed to the distributing means, said plate having a plurality of laterally spaced forwardly extending ridges forming longitudinally extending channels positioned in substantially the same forwardly extending vertical planes of the jets and said ridges being disposed in substantially the same forwardly extending vertical planes of said recesses, and means for supplying pressure fluid to said jets for propelling the fuel along said plate.

HOWARD C. WOODBRIDGE.